(12) United States Patent
Uemura et al.

(10) Patent No.: US 7,618,744 B2
(45) Date of Patent: Nov. 17, 2009

(54) THIN FILM LITHIUM BATTERY

(75) Inventors: Takashi Uemura, Itami (JP); Mitsuyasu Ogawa, Itami (JP); Nobuhiro Ota, Itami (JP); Katsuji Emura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/795,490

(22) PCT Filed: Sep. 12, 2006

(86) PCT No.: PCT/JP2006/318034

§ 371 (c)(1),
(2), (4) Date: Jul. 18, 2007

(87) PCT Pub. No.: WO2007/034709

PCT Pub. Date: Mar. 29, 2007

(65) Prior Publication Data

US 2008/0102363 A1   May 1, 2008

(30) Foreign Application Priority Data

Sep. 21, 2005  (JP)  ............................ 2005-274719
Aug. 11, 2006  (JP)  ............................ 2006-220687

(51) Int. Cl.
*H01M 6/12*   (2006.01)
*H01M 6/46*   (2006.01)
*H01M 2/00*   (2006.01)
*H01M 4/82*   (2006.01)
*H01L 31/42*  (2006.01)
*H01L 31/00*  (2006.01)

(52) U.S. Cl. ...................... 429/162; 429/163; 136/244; 136/252; 136/254; 29/623.1

(58) Field of Classification Search ......... 429/162–163, 429/304, 322; 29/623.1–623.5; 136/244, 136/252, 254
See application file for complete search history.

(56) References Cited

U.S. PATENT DOCUMENTS

| 4,599,284 A | 7/1986 | Akridge | |
|---|---|---|---|
| 2002/0092558 A1* | 7/2002 | Kim et al. | 136/244 |
| 2005/0141170 A1* | 6/2005 | Honda et al. | 361/311 |

FOREIGN PATENT DOCUMENTS

JP  4-231346  8/1992

(Continued)

OTHER PUBLICATIONS

Machine Translation, Mar. 2005, Baba et al., JP 2005-063958.*

(Continued)

*Primary Examiner*—Jennifer K Michener
*Assistant Examiner*—Claire L Rademaker
(74) *Attorney, Agent, or Firm*—Osha • Liang LLP

(57) ABSTRACT

A thin film lithium battery is provided which can realize a high yield by solving various problems caused by a pin hole formed in a solid electrolyte layer.

A thin film lithium battery according to the present invention is a thin film lithium battery in which a positive electrode layer 20, a negative electrode layer 50, a solid electrolyte layer 40 provided therebetween, and a collector 10 electrically connected to at least one of the positive electrode layer 20 and the negative electrode layer 50 are laminated to each other. When this battery is viewed in plan along the lamination direction of the above individual layers, the positive electrode layer 20 and the negative electrode layer 50 are disposed at positions so as not to be overlapped with each other. By the structure as described above, even if a pin hole is formed in the solid electrolyte layer 40, short-circuiting between the two electrode layers 20 and 50, which is caused by this pin hole, can be prevented.

10 Claims, 4 Drawing Sheets

FOREIGN PATENT DOCUMENTS

| | | |
|---|---|---|
| JP | 6-54687 | 7/1994 |
| JP | 10-83838 | 3/1998 |
| JP | 2000-340257 | 12/2000 |
| JP | 2003-068361 | 3/2003 |
| JP | 2004-95243 | 3/2004 |
| JP | 2004-127743 | 4/2004 |
| JP | 2004-179158 | 6/2004 |
| JP | 2004-206942 | 7/2004 |
| JP | 2004206942 A * | 7/2004 |
| JP | 2004-235155 | 8/2004 |
| JP | 2004235155 A * | 8/2004 |
| JP | 2004-253356 | 9/2004 |
| JP | 2004253356 A * | 9/2004 |
| JP | 2004-356082 | 12/2004 |
| JP | 2005-63958 | 3/2005 |
| JP | 2005063958 A * | 3/2005 |
| WO | WO-01/29912 A1 | 4/2001 |

OTHER PUBLICATIONS

Machine Translation, Jul. 2004, Kondo et al., JP 2004-206942.*

Machine Translation, Aug. 2004, Park et al., JP 2004-235155.*

Machine Translation, Sep. 2004, Nishimura et al., JP 2004-253356.*

International Search Report (English only) for PCT/JP2006/318034 mailed Dec. 19, 2006 (2 pages).

Patent Abstracts of Japan 2005-063958 dated Mar. 10, 2005 (1 page).

Patent Abstracts of Japan 2004-356082 dated Dec. 16, 2004 (1 page).

Patent Abstracts of Japan 2004-253356 dated Sep. 9, 2004 (1 page).

Patent Abstracts of Japan 2000-340257 dated Dec. 8, 2000 (1 page).

Patent Abstracts of Japan 2004-206942 dated Jul. 22, 2004 (1 page).

Patent Abstracts of Japan 2004-235155 dated Aug. 19, 2004 (1 page).

Patent Abstracts of Japan 2004-179158 dated Jun. 24, 2004 (1 page).

Patent Abstracts of Japan 2004-127743 dated Apr. 22, 2004 (1 page).

Patent Abstracts of Japan 10-083838 dated Mar. 31, 1998 (1 page).

Patent Abstracts of Japan 04-231346 dated Aug. 20, 1992 (1 page).

Patent Abstracts of Japan 2004-095243 dated Mar. 25, 2004 (1 page).

Patent Abstracts of Japan 2003-068361 filed Mar. 7, 2003 (1 page).

Noaki Kuwata et al., "Thin-film Lithium-ion Battery with Amorphous Solid Electrolyte Fabricated by Pulsed Laser Deposition", Electrochemistry Communications 6 (2004) pp. 417-421 accepted Feb. 19, 2004.

Steven D. Jones et al. "Thin Film Rechargeable Li Batteries", Solid State Ionics 69 (1994), pp. 357-368.

* cited by examiner

THIN FILM LITHIUM BATTERY

TECHNICAL FIELD

The present invention relates to thin film lithium batteries. In particular, the present invention relates to a thin film lithium battery capable of realizing an increase in yield and, concomitant with an increase in area, increases in capacity and current density.

BACKGROUND ART

Among all-solid-state batteries, thin film lithium batteries have been researched and developed primarily as a small battery having a very small capacity of several to several tens of microampere-hours. The structure is a laminate structure in which, for example, a positive electrode layer, a solid electrolyte layer, and a negative electrode layer are sequentially formed on a metal foil or a metal thin film formed on a ceramic substrate made of alumina or the like, which is used as a collector. As methods for forming the layers mentioned above, for example, a vapor phase deposition method, such as a sputtering method, is used, and an oxide and a Li metal are used for the solid electrolyte layer and the negative electrode layer, respectively (for example, see Patent Documents 1 to 5 and Non-Patent Documents 1 and 2).

In addition, in order to increase the capacity, an all-solid-state lithium secondary battery using a powdered solid electrolyte has been investigated. This battery generally has a laminate structure in which a positive electrode layer, a solid electrolyte layer, and a negative electrode layer are sequentially laminated to each other. As a positive electrode, a mixture composed of a powdered solid electrolyte, a powdered positive electrode active material, and a powdered conduction assistant primarily formed of carbon has been used, and as a negative electrode, besides a Li metal foil, a metal, such as Al or In, forming an alloy with Li has been used. As a solid electrolyte, a sulfide-based material having relatively high ion conductivity has been used in many cases. Since using no organic electrolyte solution, the all-solid-state batteries are superior in safety and, in addition, are very stable and not degraded at a high temperature region of 100° C. or more (for example, see Patent Documents 6 to 8).

Patent Document 1: Japanese Unexamined Patent Application Publication No. 2004-235155

Patent Document 2: Japanese Unexamined Patent Application Publication No. 2004-179158

Patent Document 3: Japanese Unexamined Patent Application Publication No. 2004-127743

Patent Document 4: Japanese Unexamined Patent Application Publication No. 10-83838

Patent Document 5: Japanese Unexamined Patent Application Publication No. 4-231346

Patent Document 6: Japanese Unexamined Patent Application Publication No. 2004-95243

Patent Document 7: Japanese Unexamined Patent Application Publication No. 2003-68361

Patent Document 8: Japanese Examined Patent Application Publication No. 6-54687

Non-Patent Document 1: Electrochemistry Communication 6, (2004), pp. 417-421

Non-Patent Document 2: Solid State Ionics 69, (1994), pp. 357-368

DISCLOSURE OF INVENTION

Problems to be Solved by the Invention

However, according to the above thin film batteries, in all the structures, since the positive electrode layer and the negative electrode layer are disposed to be overlapped with each other, and a pin hole is liable to be formed in the solid electrolyte layer due to a foreign material which adheres to an underlying layer when the solid electrolyte layer is formed, short-circuiting disadvantageously may occur between the positive and the negative electrode layers. As a result, the yield of the thin film battery has been decreased. In addition, in this type of thin film battery, when it is attempted to increase the capacity by increasing the areas of the electrode layers and the solid electrolyte layer, even if only one pin hole is formed in the solid electrolyte layer, short-circuiting occurs between the positive and the negative electrode layers, and as a result, the battery does not work at all. Furthermore, in order to prevent the formation of a pin hole, since a clean room having a high degree, of cleanness is required, a large plant investment is necessary for the installation thereof.

In addition, in an all-solid-state battery using a powdered solid electrolyte, a pressure must be applied to the whole battery in order to decrease the interface resistance between grains of the powder, and as a result, it is difficult to form common commercially available coin and card type batteries.

The present invention has been conceived in consideration of the above situation, and one object of the present invention is to provide a thin film lithium battery capable of realizing a high yield by solving various problems caused by formation of a pin hole in the solid electrolyte layer.

In addition, another object of the present invention is to provide a thin film lithium battery that can realize increases in capacity and current density concomitant with an increase in area.

Means for Solving the Problems

The above objects of the present invention are achieved by devising the laminate arrangement of positive and negative electrode layers.

A thin film lithium battery according to the present invention includes: a positive electrode layer: a negative electrode layer; a solid electrolyte layer provided therebetween; and at least one collector, which are laminated to each other, said at least one collector being electrically connected to at least one of the positive electrode layer and the negative electrode layer. When the battery is viewed along the lamination direction of the layers, the positive electrode layer and the negative electrode layer are disposed at positions so as not to be overlapped with each other.

In general, in the solid electrolyte layer formed in a layer shape, a pin hole is liable to be formed in the thickness direction. In the present invention, since the positive electrode layer and the negative electrode layer are disposed so as not to be overlapped with each other, even if a pin hole is formed in the solid electrolyte layer, the two electrode layers are not substantially short-circuited by this pin hole, and hence functions as the battery can be maintained.

In addition, unlike an all-solid-state battery using a powdered solid electrolyte, according to the present invention, since a thin film battery is formed to utilizes high adhesion between layers by a thin film technique, increases in area and capacity of the battery can be achieved while the interface resistance between an active material and the solid electrolyte layer is decreased. In particular, in the present invention, since the thin film battery is formed, a coin type battery and a card type battery can also be easily formed.

Furthermore, according to the present invention, since an all-solid-state battery using no organic electrolyte solution can be formed, inconveniences caused by the use of an organic electrolyte solution can be solved. As the above inconveniences, for example, there may be mentioned a safety problem caused by leakage of an electrolyte solution; a heat-resistance problem caused by volatilization of an organic electrolyte solution at a temperature more than its boiling point in a high temperature atmosphere; decrease in battery reaction due to considerable decrease in ion conductivity of an organic electrolyte solution in a low temperature atmosphere; and also in a low temperature atmosphere, a freezing problem of an organic electrolyte solution.

In the battery according to the present invention, one electrode layer and the other electrode layer are disposed so as not to be overlapped with each other, and in addition, the solid electrolyte layer is provided between the two electrode layers. At this stage, as the lamination structure of the layers, the case in which one electrode layer is directly formed on a metal collector and the case in which one electrode layer is formed directly on an insulating substrate or indirectly thereon with a collector provided therebetween are mentioned.

In the former case described above, the collector is made from a metal, said one electrode layer is formed directly on a part of this collector with no electrical insulating layer provided therebetween, and an electrical insulating layer is formed on a surface of the other part of the collector on which said one electrode layer is not formed. In addition, on said one electrode layer and the electrical insulating layer, the solid electrolyte layer is formed, and the other electrode layer is formed on the electrolyte layer at a position so as not to be overlapped with said one electrode layer.

According to this structure, the other electrode is provided above said one electrode layer with the solid electrolyte layer interposed therebetween but is not overlapped with said one electrode layer. In addition, the other electrode layer faces the collector electrically connected to said one electrode layer; however, the electrical insulating layer is provided between the other electrode layer and the collector. Hence, even if a pin hole is present in the solid electrolyte layer, short-circuiting between the other electrode layer and the collector can be suppressed.

Next, in the latter case described above, the collector is formed on a part of the insulating substrate, followed by forming said one electrode layer to cover the collector, or said one electrode layer is formed directly on a part of the insulating substrate. Subsequently, the solid electrolyte layer is formed on said one electrode layer and the insulating substrate, and on this electrolyte layer, the other electrode layer is formed at a position so as not to be overlapped with said one electrode layer.

Also in this structure, the other electrode is provided above said one electrode layer with the solid electrolyte layer interposed therebetween but is not overlapped with said one electrode layer and the collector. In addition, although the other electrode layer faces the surface of the solid electrolyte layer, the insulating substrate is provided on the rear surface of the solid electrolyte layer. Hence, even if a pin hole is present in the solid electrolyte layer, short-circuiting between the other electrode layer and said one electrode layer (collector) can be suppressed. As the insulating substrate of the present invention, for example, a ceramic, such as alumina or $SiO_2$, or a plastic such as poly(ethylene terephthalate) (PET) may be used.

In addition, in the battery of the present invention, the positive electrode layer and the negative electrode layer are preferably not disposed on the same plane.

In the case in which the positive electrode layer and the negative electrode layer are formed on the same plane, when a conductive foreign material is present on that plane, the two electrode layers may be short-circuited in some cases. Accordingly, when the positive electrode layer and the negative electrode layer are not disposed on the same plane, short-circuiting caused by interface conduction via the foreign material can be suppressed. In order to form the two electrode layers on different planes, a method may be mentioned in which the solid electrolyte layer and the electrical insulating layer are both or the solid electrolyte layer is only formed on the plane on which one electrode layer is provided so as to form a step between the other electrode layer and said one electrode layer.

Furthermore, in the battery of the present invention, it is preferable that the solid electrolyte layer be formed of a first electrolyte layer facing the positive electrode layer and a second electrolyte layer facing the negative electrode layer, and that the first electrolyte layer and the second electrolyte layer be formed to have different compositions.

By the structure described above, at least one of the interface resistances between the solid electrolyte layer and the positive electrode layer and between the solid electrolyte layer and the negative electrode layer can be decreased. Accordingly, improvement in battery performance, such as increase in battery capacity, can be achieved.

For the first (second) electrolyte layer, a material having an interface resistance of 10,000 $\Omega \cdot cm^2$ or less with the positive electrode layer (negative electrode layer) is preferably used. The interface resistance is more preferably 5,000 $\Omega \cdot cm^2$ or less, still more preferably 1,000 $\Omega \cdot cm^2$ or less, and even more preferably 500 $\Omega \cdot cm^2$ or less. In addition, for the first electrolyte layer, a material is preferably used which can decrease the interface resistance with the positive electrode layer as compared to that in the case in which the solid electrolyte layer is formed of one layer using the same material as that for the second electrolyte layer, and in addition, for the second electrolyte layer, a material is preferably used which can decrease the interface resistance with the negative electrode layer as compared to that in the case in which the solid electrolyte layer is formed of one layer using the same material as that for the first electrolyte layer. By selecting the material as described above, the interface resistance between the solid electrolyte layer and the positive electrode layer or that between the solid electrolyte layer and the negative electrode layer can be decreased. In particular, for example, Li-P-S-N may be mentioned as the first electrolyte layer, and Li-P-S-O may be mentioned as the second electrolyte layer. The thickness of the first electrolyte layer may not coincide with that of the second electrolyte layer.

In addition, between the first electrolyte layer and the second electrolyte layer, an intermediate electrolyte layer having a different composition may also be provided. For the intermediate electrolyte layer, an electrolyte material having a relatively high ion conductivity can be preferably used. In addition, this intermediate electrolyte layer itself may be formed of one layer or a plurality of layers.

Hereinafter, the structures of individual parts of the present invention will be described in detail.

(Material for Positive Electrode Layer)

The positive electrode layer is formed of a layer containing an active material occluding and releasing lithium ions. In particular, an oxide selected from the group consisting of lithium cobalt oxide ($LiCoO_2$), lithium nickel oxide ($LiNiO_2$), lithium manganese oxide ($LiMn_2O_4$), and olivine-type lithium iron phosphate ($LiFePO_4$), or a mixture thereof may be preferably used. In addition, the positive electrode layer may also be preferably formed from a sulfide selected from the group consisting, for example, of sulfur (S), lithium sulfide, and titanium sulfide ($TiS_2$), or a mixture thereof.

(Method for Forming Positive Electrode Layer)

As a method for forming the positive electrode layer, a wet method and a dry method can be used. As the wet method, for example, a sol-gel method, a colloid method, and a casting method may be mentioned. As the dry method, for example, a vapor phase deposition method, such as an evaporation method, an ion plating method, a sputtering method, or a laser ablation method, may be mentioned.

(Material for Negative Electrode Layer)

The negative electrode layer is also formed of a layer containing an active material occluding and releasing lithium ions. For example, as the negative electrode layer, one selected from the group consisting of a lithium metal and a metal capable of forming an alloy therewith, or a mixture or an alloy thereof may be preferably used. As the metal capable of forming an alloy with Li, at least one selected from the group consisting of aluminum (Al), silicon (Si), tin (Sn), bismuth (Bi), and indium (In) (hereinafter referred to as an "alloying material") may be preferable.

The negative electrode layer containing the element mentioned above may have a function as the collector by itself and is preferable since its ability of occluding and releasing lithium ions is high. In particular, silicon (Si) has high ability of occluding and releasing lithium ions as compared to that of graphite (black lead) and can increase the energy density.

In addition, since an alloy phase with a Li metal is used as the negative electrode layer, an effect can be obtained in which migration resistance of lithium ions at the interface between an alloyed alloying material with a Li metal and a lithium-ion conductive solid electrolyte layer can be decreased, and an increase in resistance of the alloying material in a first cycle at the initial charge stage can be suppressed.

Furthermore, when a metal element that is an alloying material is used for the negative electrode layer, in a first charge-discharge cycle, there is a problem in that a discharge capacity is considerably small as compared to a charge capacity; however, when a negative electrode layer material obtained beforehand by alloying a Li metal with an alloying material is used, this irreversible capacity can be suppressed to extremely low. Hence, it is not necessary to charge an additional amount of a positive electrode active material corresponding to the irreversible capacity, and hence the capacity density of a thin film battery can be improved.

(Structure of Negative Electrode Layer)

Without forming a collector for the negative electrode layer, the negative electrode layer (negative electrode active material) itself may have a function as the collector. In this case, it is preferable since the collector for the negative electrode layer be omitted. In particular, it is preferable that the negative electrode layer be formed to have a pattern, and that the pattern be formed of a plurality of divided regions. At this stage, the individual divided regions are preferably connected to a lead portion for power collection by meltdown portions. Of the divided regions, when one divided region (negative electrode layer) is short-circuited with the collector of the positive electrode layer, the meltdown portion between the lead portion and the short-circuited divided region is melted down, and hence safety of the battery can be ensured. For example, the individual divided regions are each formed in an island shape, and a major wire (lead portion) for power collection is connected to the individual islands by fine wires (meltdown portions). By the structure described above, even if an abrupt increase in current occurs in one of the islands by short-circuiting or the like, the corresponding fine wire is melted down, so that electrical conduction between the short-circuited island and the major wire is blocked, and hence a short-circuiting state is avoided from being continued.

It is preferable that the meltdown portion be formed of the same material as that for the divided region and the lead portion and have a small cross-sectional area compared to that of the divided region and the lead portion. By the structure described above, meltdown caused by a short-circuiting current can be reliably generated. In general, since the divided region, the lead portion, and the meltdown portion are formed by pattern formation to have thicknesses substantially equivalent to each other, the width of the meltdown portion may be formed to be smaller than that of the divided region and the lead portion. A so-called fuse effect as described above can be improved when the negative electrode layer material is formed of a metal having a lower melting point, and in the case of an alloy-based material, the effect can be further improved when an alloy phase with a Li metal is formed beforehand.

(Material for Solid Electrolyte Layer)

It is preferable that the solid electrolyte layer be a Li ion conductor, the Li ion conductance (20° C.) of the solid electrolyte layer be $10^{-5}$ S/cm or more, and the Li ion transportation number be 0.999 or more. In particular, it is preferable that the Li ion conductance be $10^{-4}$ S/cm or more, and the Li ion transportation number be 0.9999 or more. As a material for the solid electrolyte layer, a sulfide-based material is preferable, and the solid electrolyte layer is preferably formed of Li, P and S and may further contain oxygen.

(Method for Forming Negative Electrode Layer and Solid Electrolyte Layer)

As methods for forming the negative electrode layer and the solid electrolyte layer, a vapor phase deposition method is preferable. As the vapor phase deposition method, for example, a PVD (physical vapor phase synthesis) method and a CVD (chemical vapor phase synthesis) method may be mentioned. In particular, for example, as the PVD method, a vacuum evaporation method, a sputtering method, an ion plating method, or a laser ablation method may be mentioned, and as the CVD method, a thermal CVD method or a plasma CVD method may be mentioned.

(Collector)

On the other hand, a metal foil is preferably used for the collector. As a negative electrode collector material, for example, one selected from the group consisting of copper (Cu), nickel (Ni), iron (Fe), chromium (Cr) and a mixture thereof may be mentioned. Since these metals do not form intermetallic compounds with lithium (Li), inconveniences of the intermetallic compounds formed with lithium can be prevented. As the inconveniences described above, for example, a decrease in power collection due to structural destruction of the negative electrode layer caused by expansion and contraction by charge and discharge operation, and an inconvenience in that the negative electrode layer is liable to fall down from the collector due to degradation in adhesion of the negative electrode layer thereto. As a particular example of the positive electrode collector, for example, there may be mentioned one selected from the group consisting of aluminum (Al), nickel (Ni), an alloy thereof, and a stainless steel.

Those collectors may be formed by a PVD method or a CVD method. In particular, when the collector is formed to have a predetermined pattern, by using an appropriate mask, a collector having a predetermined pattern can be easily formed.

Advantages

By the thin film lithium battery of the present invention, the following effects can be obtained.

(1) Since the positive electrode layer and the negative electrode layer are disposed so as not to be overlapped with each other, even if a pin hole is formed in the solid electrolyte layer, the two electrode layers are not substantially short-circuited by this pin hole, and as a result, the functions as the battery can be maintained.

(2) In addition, degradation in yield caused by a pin hole present in the solid electrolyte layer can be suppressed, and as a result, a high yield can be realized. In particular, without using an electrolyte solution, an all-solid-state thin film lithium battery having superior safety, heat resistance, and low-temperature properties can be formed. Accordingly, by increasing the area, increases in capacity and current density can be realized, and as a result, a lithium secondary battery having a high battery capacity and superior charge-discharge cycle properties can be obtained.

Figure 1:
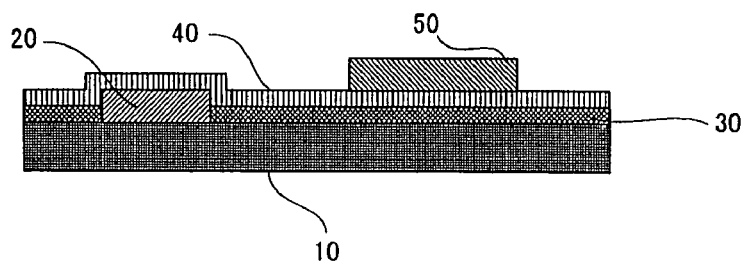
FIG. 1 is a longitudinal cross-sectional view of a battery of Example 1 according to the present invention.

REFERENCE NUMERALS 10, 11 collector
20 positive electrode layer
30 electrical insulating layer
40 solid electrolyte layer
40L first electrolyte layer
40U second electrolyte layer
50 negative electrode layer
60 insulating substrate
70 mask
71 comb electrode hole
71A wiring hole
71B comb tooth hole
80 mask
81, 82 comb electrode hole
81A, 82A wiring hole
81B, 82B comb tooth hole
83 major wire hole
84 lead fixing hole
85 fine wire hole

BEST MODE FOR CARRYING OUT THE INVENTION

Hereinafter, the embodiments of the present invention will be described.

EXAMPLE 1

FIG. 1 is a longitudinal cross-sectional view of a battery according to the present invention. This battery has a positive electrode layer 20 and an electrical insulating layer 30 on a collector 10 made of a metal foil, a solid electrolyte layer 40 is formed on the above two layers 20 and 30, and in addition, a negative electrode layer 50 is formed on this electrolyte layer 40.

In this battery, the collector 10 is most preferably made of a metal selected from the group consisting of aluminum (Al), nickel (Ni), iron (Fe), and stainless steel. The positive electrode layer 20 is formed on a part of a collector surface to have a predetermined pattern. On the other part of the collector surface, on which the positive electrode layer 20 is not formed, the electrical insulating layer 30 is formed. Since the positive electrode layer 20 is thicker than the electrical insulating layer 30, the surface of the positive electrode layer 20 protrudes from the electrical insulating layer 30. In addition, the solid electrolyte layer 40 is formed so as to cover the positive electrode layer 20 and the electrical insulating layer 30. That is, the solid electrolyte layer 40 is in contact with the upper surface of the positive electrode layer 20 and is in contact with the lower surface of the negative electrode layer 50, and a part of the solid electrolyte layer 40, which is provided on the positive electrode layer 20, is only in a protruding state. On the other hand, the negative electrode layer 50 is formed on the solid electrolyte layer 40 at a position so as not to be overlapped with the positive electrode layer 20. The negative electrode layer 50 is also formed to have a predetermined pattern. For example, when the positive electrode layer 20 and the negative electrode layer 50 are formed to have a comb shape, the amount of current allowed to pass through the battery can be increased as a whole.

In the structure described above, when the positive electrode layer 20 is formed on the collector 10, the collector 10 is exposed to an air atmosphere so that the part of the collector surface other than that on which the positive electrode layer 20 is to be formed is oxidized to form a metal oxide layer, and this oxide layer is preferably used as the electrical insulating layer 30. In addition, after the positive electrode layer 20 is formed, the electrical insulating layer 30, such as a metal oxide layer or an organic polymer layer, may be formed on the part of the collector surface other than that on which the positive electrode layer 20 is formed using a mask having a pattern corresponding to the pattern of the positive electrode layer 20.

By the battery having this structure, since the positive electrode layer 20 and the negative electrode layer 50 are disposed at different positions so as not be overlapped with each other in the thickness direction thereof, even if a pin hole is formed in the solid electrolyte layer 40 provided between the two electrode layers, the two electrode layers can be prevented from being short-circuited. In addition, although the negative electrode layer 50 faces the collector electrically connected to the positive electrode layer 20, the electrical insulating layer 30 is formed between the collector 10 and the solid electrolyte layer 40, which are located under the negative electrode layer 50. Hence, even if a pin hole is formed in the solid electrolyte layer 40 under the negative electrode layer, short-circuiting between the negative electrode layer 50 and the collector 10 can be suppressed.

EXAMPLE 2

Figure 2:
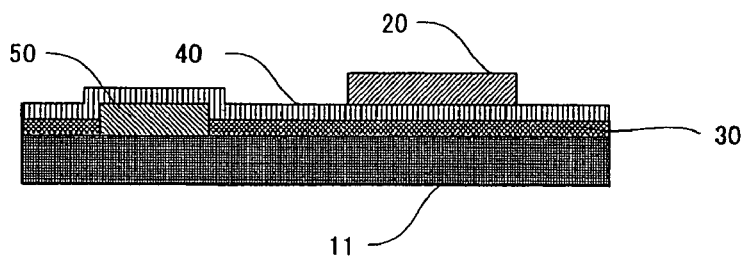
FIG. 2 is a longitudinal cross-sectional view of a battery of Example 2 according to the present invention.

FIG. 2 is a longitudinal cross-sectional view of a battery according to the present invention, the structure of which is different from that of Example 1. The basic structure of this example is approximately equivalent to that of Example 1 except that the position of the positive electrode layer 20 is switched with the position of the negative electrode layer 50.

That is, the battery of this example has the negative electrode layer 50 and the electrical insulating layer 30 on a collector 11 made of a metal foil, the solid electrolyte layer 40 is formed on the above two layers 50 and 30, and in addition, the positive electrode layer 20 is formed on this electrolyte layer 40.

In this battery, as the collector 11 in contact with the negative electrode layer 50, a metal selected from the group consisting of copper (Cu), nickel (Ni), iron (Fe), and stainless steel is most preferably used. In addition, in this structure, although not being shown, a positive electrode collector is formed at the positive electrode side. This positive electrode collector is formed only on the positive electrode layer and is not formed on an area on which the positive electrode layer 20 is not formed. Accordingly, even if a pin hole is formed in the solid electrolyte layer 40 on the negative electrode layer 50, the negative electrode layer 50 and the positive electrode collector can be prevented from being short-circuited.

By the structure of this example, since the positive electrode layer 20 and the negative electrode layer 50 are also disposed at different positions so as not be overlapped with each other in the thickness direction thereof, as is the case of Example 1, even if a pin hole is formed in the solid electrolyte layer 40 provided between the two electrode layers, the two electrode layers can be prevented from being short-circuited. In addition, since the electrical insulating layer 30 is formed between the positive electrode layer 20 and the collector 11, even if a pin hole is formed in the solid electrolyte layer 40 under the positive electrode layer, short-circuiting between the positive electrode layer 20 and the collector 11 can be suppressed.

EXAMPLE 3

Figure 3:
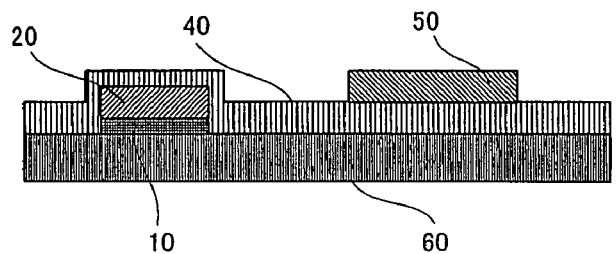
FIG. 3 is a longitudinal cross-sectional view of a battery of Example 3 according to the present invention.

FIG. 3 is a longitudinal cross-sectional view of a battery using an insulating substrate, according to the present invention. In this example, the collector 10 made of a metal foil is formed on an insulating substrate 60 to have a pattern, the positive electrode layer 20 is formed on the collector to be overlapped therewith, and the solid electrolyte layer 40 is formed so as to cover the insulating substrate 60 and the positive electrode layer 20. Subsequently, the negative electrode layer 50 is formed on the electrolyte layer 40 at a position so as not to be overlapped with the positive electrode layer 20.

In this battery, as the insulating substrate 60, a sheet material made, for example, of a ceramic or an organic polymer, is preferably used. At the position at which the collector 10 and the positive electrode layer 20 are provided, the solid electrolyte layer 40 is formed so as to protrude from the other positions. In addition, although being not clearly shown in FIG. 3, the surface of the collector 10 located under the positive electrode layer 20 is partly exposed, and through this exposed part, power collection can be performed.

By the structure of this example, since the positive electrode layer 20 and the negative electrode layer 50 are also disposed at different positions so as not be overlapped with each other in the thickness direction thereof, as is the case of Example 1, even if a pin hole is formed in the solid electrolyte layer 40 provided between the two electrode layers, the two electrode layers can be prevented from being short-circuited. In addition, although the solid electrolyte layer 40 is located under the negative electrode layer 50, the insulating substrate 60 is located under this electrolyte layer 40, and the negative electrode layer 50 is disposed so as not to be overlapped with the collector 10 located under the positive electrode layer 20; hence, even if a pin hole is present in the solid electrolyte layer 40 under the negative electrode layer, the negative electrode layer 50 and the collector 10 can be prevented from being short-circuited. Furthermore, in this example, since the negative electrode layer 50 itself also functions as a negative electrode-layer collector, the collector for the negative electrode layer is not required, and hence the battery structure can be simplified.

EXAMPLE 4

Figure 4:
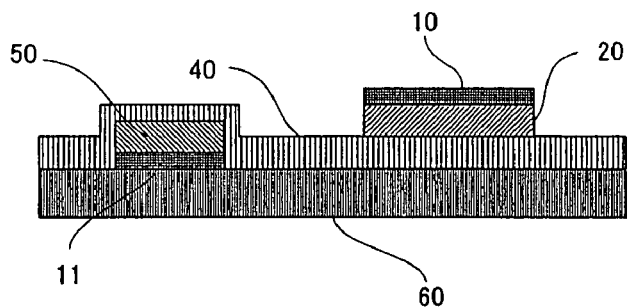
FIG. 4 is a longitudinal cross-sectional view of a battery of Example 4 according to the present invention.

FIG. 4 is a longitudinal cross-sectional view of a battery according to the present invention, in which the position of the positive electrode layer and the position of the negative electrode layer shown in FIG. 3 are switched with each other. In this battery, the collector 11 made of a metal foil is formed on the insulating substrate 60 to have a pattern, the negative electrode layer 50 is formed on this collector to be overlapped therewith, and in addition, the solid electrolyte layer 40 is formed so as to cover the insulating substrate 60 and the negative electrode layer 50. Subsequently, the positive electrode layer 20 is formed on this electrolyte layer at a position so as not to be overlapped with the negative electrode layer 50. Furthermore, in this example, the collector 10 is formed on the upper surface of the positive electrode layer 20. This collector 10 is formed only on the upper surface of the positive electrode layer 20 and is not formed on the other positions.

In this structure, since the positive electrode layer 20 and the negative electrode layer 50 are also disposed at different positions so as not to be overlapped with each other in the thickness direction thereof, even if a pin hole is formed in the solid electrolyte layer 40 provided between the two electrode layers, the two electrode layers can be prevented from being short-circuited. In addition, although the solid electrolyte layer 40 is located under the positive electrode layer 20, since the insulating substrate 60 is provided under this electrolyte layer 40, and the positive electrode layer 20 is disposed so as not to be overlapped with the collector 11 located under the negative electrode layer 50, even if a pin hole is present in the solid electrolyte layer 40 under the positive electrode layer, the positive electrode layer 20 and the collector 11 can be prevented from being short-circuited.

EXAMPLE 5

Figure 5:
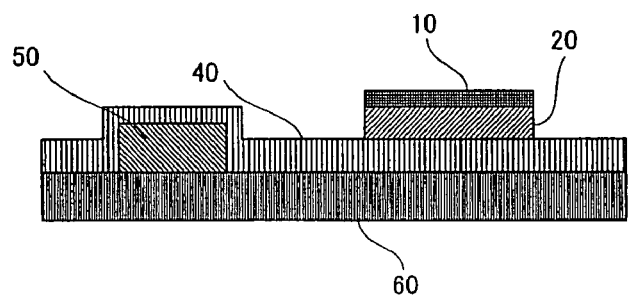
FIG. 5 is a longitudinal cross-sectional view of a battery of Example 5 according to the present invention.

FIG. 5 is a longitudinal cross-sectional view of a battery according to the present invention, in which the negative electrode layer is directly formed on the insulating substrate. In this example, the negative electrode layer 50 is formed on a part of the insulating substrate 60 to have a predetermined pattern, and the solid electrolyte layer 40 is formed so as to cover the negative electrode layer 50 and the other part of the insulating substrate 60. Subsequently, the positive electrode layer 20 and the collector 10 are sequentially formed on the solid electrolyte layer 40 at a position so as not to be overlapped with the negative electrode layer 50. This collector 10 is formed only on the positive electrode layer 20 and is not formed on the other positions. Although being not shown in the figure, the negative electrode layer 50 is partly exposed through the solid electrolyte layer 40 and is formed so that power collection can be performed through the exposed position.

In the battery of this example, since the positive electrode layer 20 and the negative electrode layer 50 are also disposed at different positions so as not to be overlapped with each other in the thickness direction thereof, even if a pin hole is formed in the solid electrolyte layer 40 provided between the two electrode layers, the two electrode layers can be prevented from being short-circuited. In addition, in this example, since the negative electrode layer 50 itself also functions as a negative electrode-layer collector, the collector for the negative electrode layer is not required, and hence the battery structure can be simplified.

EXAMPLE 6

Figure 6:
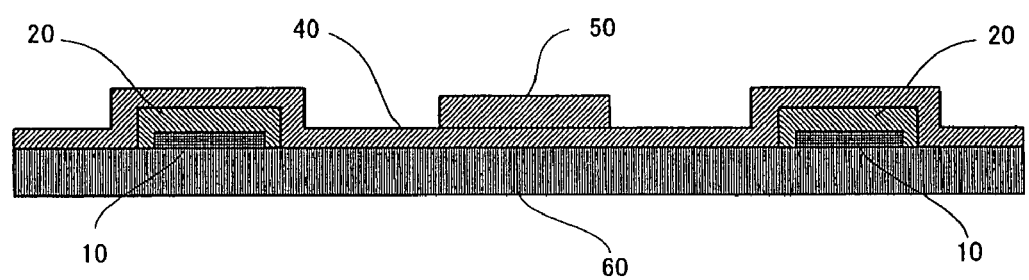
FIG. 6 is a longitudinal cross-sectional view of a battery of Example 6 according to the present invention.

Furthermore, a modification of Example 3 is shown in FIG. 6. Also in this battery, the collectors 10 are formed on the insulating substrate 60, and the positive electrode layers 20 are formed on the collectors 10. Subsequently, the solid electrolyte layer 40 is formed on the positive electrode layers 20, and on this electrolyte layer 40, the negative electrode layer 50 is formed. FIG. 6 is a partial cross-sectional view of a thin film battery having the structure in which the negative electrode layer 50 is disposed between a pair of the positive electrode layers 20.

In this battery, the positive electrode layer 20 is formed so as to cover the side surfaces of the collector 10 besides the upper surface thereof. Accordingly, it is intended to increase a contact area between the positive electrode layer 20 and the collector 10. In addition, as are the cases of Examples 1 to 5, the negative electrode layer 50 and the positive electrode layer 20 are not overlapped with each other and are not formed on the same plane. In this battery, the positive electrode layer 20 is formed on the corresponding collector 10, and the negative electrode layer 50 is formed on the solid electrolyte layer 40. Hence, even if some conductive foreign material adheres between the negative electrode layer 50 and the positive electrode layer 20, short-circuiting therebetween by interface conduction via this foreign material can be effectively suppressed. Of course, as described in the above examples, by forming the positive electrode layer 20 and the negative electrode layer 50 at different positions when viewed in plan, short-circuiting between the two electrode layers 20 and 50 can also be suppressed.

EXAMPLE 7

Figure 7:
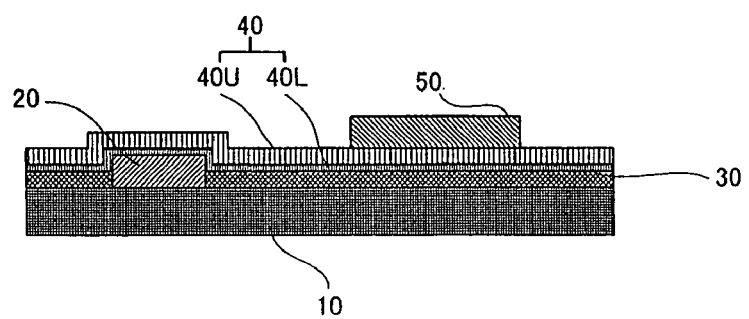
FIG. 7 is a longitudinal cross-sectional view of a battery of Example 7 according to the present invention.

FIG. 7 is a longitudinal cross-sectional view of a battery according to the present invention, which includes a solid electrolyte layer made of two layers. A battery of this example has a basic structure equivalent to that of Example 1 except that the solid electrolyte layer 40 is formed of a first electrolyte layer 40L in contact with the positive electrode layer 20 and a second electrolyte layer 40U in contact with the negative electrode layer 50.

In this battery, the first electrolyte layer 40L is formed using a material capable of decreasing interface resistance with the positive electrode layer 20 as compared to the case in which the solid electrolyte layer 40 is formed of one layer using the same material as that for the second electrolyte layer 40U. For example, Li-P-S-N is used for the first electrolyte layer 40L, and Li-P-S-O is used for the second electrolyte layer 40U.

By the structure described above, compared to the case in which the solid electrolyte layer 40 is formed of one layer using Li-P-S-O, the interface resistance between the first electrolyte layer 40L and the positive electrode layer 20 can be decreased. Accordingly, battery performance, such as battery capacity, can be improved.

Experimental Example 1

Figure 8:
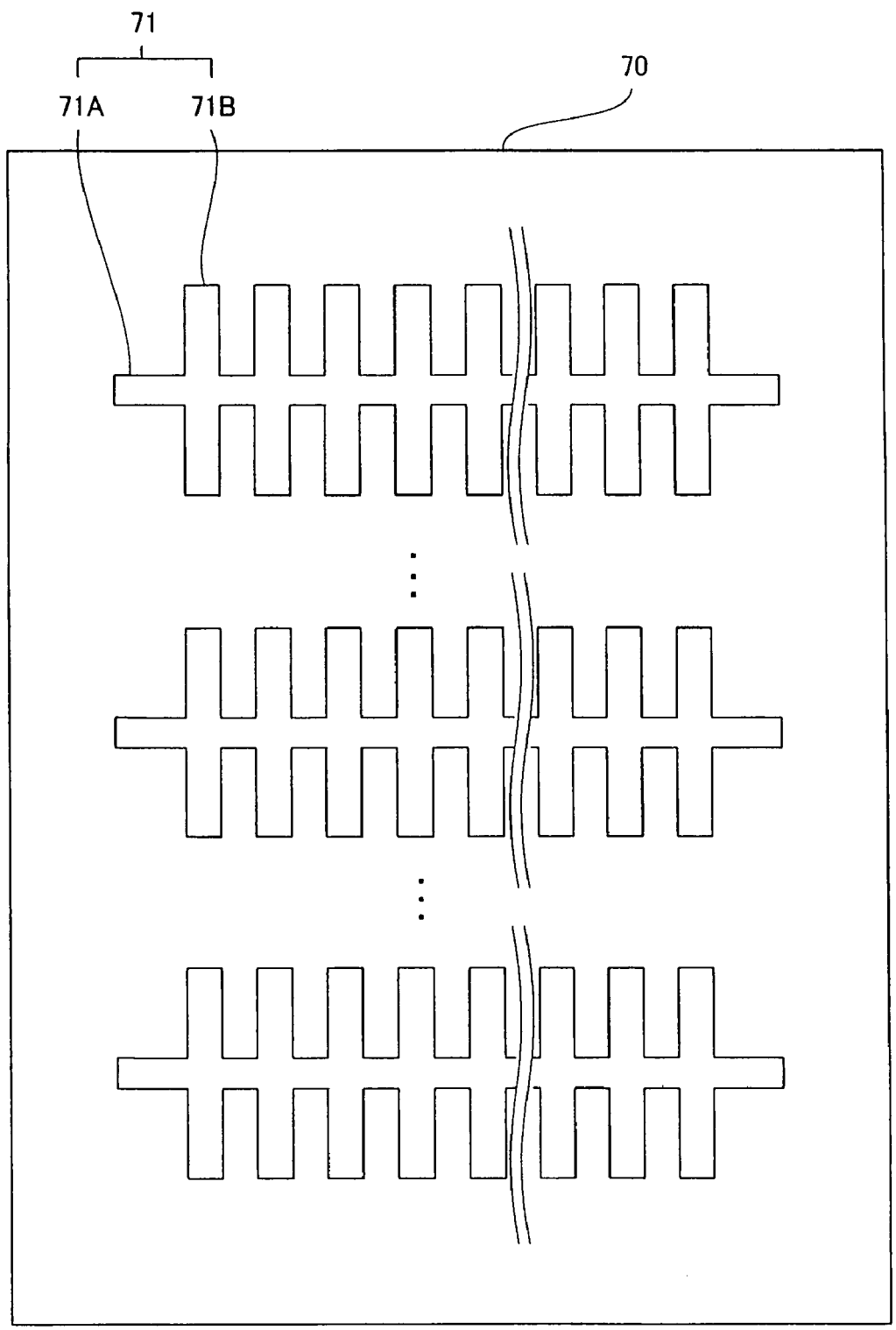
FIG. 8 is a schematic view showing a pattern of a mask used when a positive electrode layer is formed.

In accordance with the structure shown in FIG. 1, a thin film lithium battery was formed using an Al foil for the positive electrode collector, a $LiCoO_2$ film for the positive electrode layer, Li-P-S-O for the solid electrolyte layer, and a Li metal film for the negative electrode layer. First, a square Al foil having a thickness of 10 μm and a side length of 10 cm was fixed to a stainless steel-made substrate holder, and a stainless steel-made mask for a positive electrode was fixed on the above Al foil. In a mask 70, as shown in FIG. 8, eight two-sided teeth comb electrode holes 71 were formed in each of which at two sides of a wiring hole 71A, which had a width of 1 mm and a length of 8 cm, in the width direction, comb tooth holes 71B each having a width of 1 mm and a length of 4 mm were provided at intervals of 1 mm in a direction perpendicular to the wiring hole 71A. At two end portions of each comb electrode hole 71, the comb tooth holes 71B are not formed.

The $LiCoO_2$ film (positive electrode layer) was formed on this substrate (Al foil) by an excimer laser ablation method. A KrF excimer laser having a wavelength of 248 nm was used as the excimer laser. Film formation was performed for 5 hours under laser conditions in which a substrate temperature was 500° C., the degree of vacuum was $10^{-2}$ Pa in an oxygen gas atmosphere, a repetitive pulse was 10 Hz, and an energy density was 2 j/cm². At this stage, right before the laser film formation, cleaning of a substrate surface was performed using argon ion beams. When a film on a Si substrate provided beforehand for film thickness measurement was measured using a stylus type film thickness meter, it was found that the film thickness of the positive electrode layer was 10 μm, and that the capacity of a positive electrode active material provided over the entire substrate was 1.6 mAh. In addition, when the electrical resistance of the surface of the Al foil on which the positive electrode layer was not formed was measured, it was 1 MΩ or more, and it was found that an electrical insulating layer was formed on the surface of the Al foil.

After this mask was removed, in accordance with the following procedure, a solid electrolyte layer having a lithium (Li)-phosphorus(P)-sulfur(S)-oxygen(O) composition was formed over the entire surface by an excimer laser ablation method. In a glove box in which an argon gas having a dew point of −80° C. was filled, lithium sulfide ($Li_2S$), phosphorus pentasulfide ($P_2S_5$), and phosphorus pentoxide ($P_2O_5$) were mixed together, and the mixed powder thus obtained was further placed in a mold, followed by applying a pressure, so that a target in the form of pellet was formed.

The target was transferred from the glove box to a film-forming apparatus so as not to be exposed to air and was placed therein, and laser light was focused on the target to vaporize a raw material, thereby forming a film on the substrate. The substrate is not particularly heated.

After the film of the solid electrolyte layer was formed, the film composition was analyzed by ESCA 5400MC manufactured by Phi Inc, and it was found that the lithium(Li)-phosphorus(P)-sulfur(S)-oxygen(O) composition included 26, 13, 54, and 7 atomic percent, respectively. In addition, when the cross-section of the film formed on the Si substrate for film thickness measurement was observed by a scanning electron microscope (SEM), it was found that the film thickness of the solid electrolyte layer was 1 μm. Furthermore, when a comb electrode of Au was formed on the solid electrolyte layer on a glass substrate, and complex impedance measurement was then performed, it was found that the ion conductivity of the solid electrolyte layer was $2\times10^{-4}$ S/cm.

Figure 9:
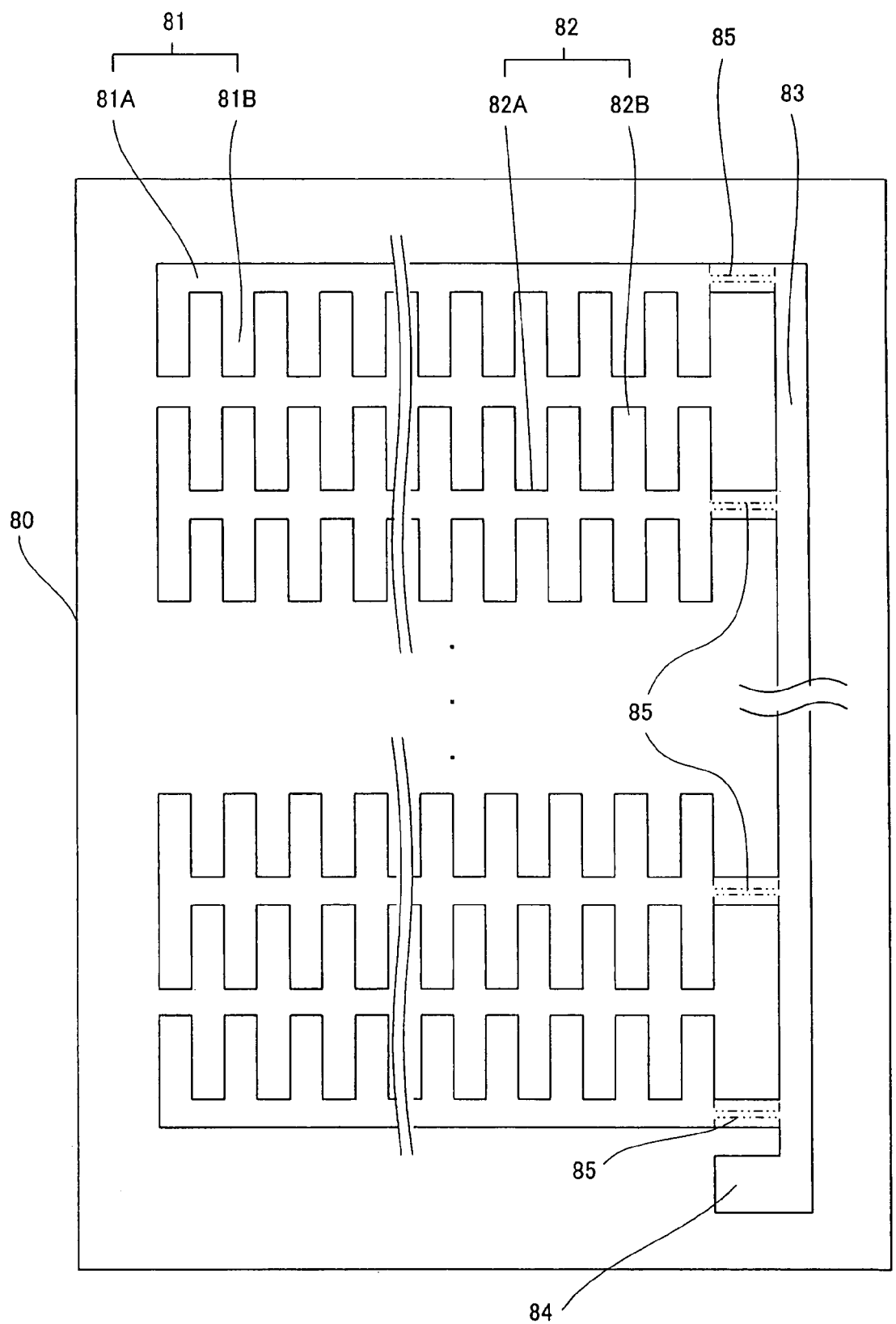
FIG. 9 is a schematic view showing a pattern of a mask used when a negative electrode layer is formed.

On the substrate on which the collector, the positive electrode layer, and the solid electrolyte layer were formed, a negative electrode mask was fixed. In this negative electrode mask 80, as shown in FIG. 9, nine comb electrodes holes 81 and 82 were formed in rows which had shapes so as to form comb electrodes in combination with the mask 70 (FIG. 8) used for forming the positive electrode layer. The comb electrode holes 81 in a first and a ninth row were one-sided teeth electrode holes in each of which, that is, comb tooth holes 81B were formed at one side of a wiring hole 81A in a direction perpendicular thereto, and the comb electrode holes 82 in a second to an eighth row were two-sided teeth comb electrode holes in each of which, that is, two-sided tooth holes 82B were formed at two sides of a wiring hole 82A in a direction perpendicular thereto. Furthermore, one-ends of the wiring holes 81A and 82A of the comb electrode holes disposed in the nine rows were connected to one major wire hole 83 having a width of 1 mm and a length of 9 cm, and at one end portion of this major wire hole 83, a square lead fixing hole 84 having a side length of 5 mm was provided. This mask 80 was disposed when viewed in plan so that the individual electrode holes 81 and 82 are not overlapped with the positive electrode layer formed beforehand. The comb negative electrode layer formed by this mask 80 and the comb positive electrode layer formed beforehand were disposed in parallel, and the distance therebetween was 0.1 mm.

By an evaporation method, a Li metal film used as the negative electrode layer was formed on the substrate provided with the mask at a degree of vacuum of $10^{-4}$ Pa. By an ICP analysis (Inductively Coupled Plasma Atomic Emission Spectrometry) of a film formed on a stainless steel substrate for film thickness measurement, it was found that the film thickness was 1 µm.

Next, battery evaluation of the thin film battery thus formed was performed. An end portion of a rear surface of the Al substrate was rasped in a dry room at a dew point of $-60°$ C. to expose an Al metal surface, and an Al-made lead was welded to this metal surface by ultrasonic welding. In addition, a lead of a Cu foil was welded to a lead fixing portion of the Li metal film (negative electrode layer) by ultrasonic welding. Furthermore, portions other than the end portions of the leads were sealed with a polymer-made sealing material and a sealing member made of an aluminum laminate bag, so that only the end portions were exposed.

By using this battery, a charge-discharge cycle test in a voltage range of 4.2 to 3 V was performed at 1 C (C indicating the battery capacity) by constant current control. Before the charge-discharge test, an OCV (open circuit voltage) of 3 V or more was observed. In addition, when the battery in a charged state was held for 24 hours, the voltage drop was not observed at all, and it was confirmed that no short-circuiting occurred between the positive electrode layer and the negative electrode layer. Furthermore, in this cycle test, a stable drive of 1,000 cycles or more was confirmed.

Experimental Example 2

In accordance with the structure shown in FIG. 3, a thin film lithium battery was formed using alumina for the insulating substrate, an Al foil for the positive electrode collector, a LiCoO$_2$ film for the positive electrode layer, Li-P-S-O for the solid electrolyte layer, and an Al-Li alloy film for the negative electrode layer. First, a square Al plate having a thickness of 1 mm and a side length of 10 cm was fixed to a stainless steel-made substrate holder, and a stainless steel-made mask was fixed on the above Al plate. The mask had a similar structure to that shown in FIG. 8.

An Al thin film having a thickness of 0.1 µm was formed on this substrate by an evaporation method. In addition, the LiCoO$_2$ film (positive electrode layer) was formed by an excimer laser ablation method while the mask is being held. A KrF excimer laser having a wavelength of 248 nm was used as the excimer laser. Film formation was performed for 5 hours under laser conditions in which a substrate temperature was 500° C., the degree of vacuum was $10^{-2}$ Pa in an oxygen gas atmosphere, a repetitive pulse was 10 Hz, and an energy density was 2 j/cm$^2$. At this stage, right before the laser film formation, cleaning of a substrate surface was performed using argon ion beams. When a film on a Si substrate provided beforehand for film thickness measurement was measured using a stylus type film thickness meter, it was found that the film thickness of the positive electrode layer was 10 µm, and that the capacity of a positive electrode active material provided over the entire substrate was 1.6 mAh. In addition, when the electrical resistance of the surface of the Al foil on which the positive electrode layer was not formed was measured, it was 1 MΩ or more, and it was found that an electrical insulating layer was formed on the surface of the Al foil.

After this mask was removed, in accordance with the following procedure, a solid electrolyte layer having a lithium (Li)-phosphorus(P)-sulfur(S)-oxygen(O) composition was formed over the entire surface of the substrate by an excimer laser ablation method. In a glove box in which an argon gas having a dew point of $-80°$ C. was filled, lithium sulfide (Li$_2$S), phosphorus pentasulfide (P$_2$S$_5$), and phosphorus pentoxide (P2O5) were mixed together, and the mixed powder thus obtained was further placed in a mold, followed by applying a pressure, so that a target in the form of pellet was formed.

The target was transferred from the glove box to a film-forming apparatus so as not to be exposed to air and was placed therein, and laser light was focused on the target to vaporize a raw material, thereby forming a film of the solid electrolyte layer on the substrate. The substrate is not particularly heated.

After the film of the solid electrolyte layer was formed, the film composition was analyzed by ESCA 5400MC manufactured by Phi Inc, and it was found that the lithium(Li)-phosphorus(P)-sulfur(S)-oxygen(O) composition included 26, 13, 54, and 7 atomic percent, respectively. In addition, when the cross-section of the film on the Si substrate for film thickness measurement was observed by a scanning electron microscope (SEM), it was found that the film thickness of the solid electrolyte layer was 1 µm. Furthermore, when a comb electrode of Au was formed on the solid electrolyte layer provided on a glass substrate, and complex impedance measurement was then performed, it was found that the ion conductivity of the solid electrolyte layer was 2×10$^4$ S/cm.

On the substrate on which the collector, the positive electrode layer, and the solid electrolyte layer were formed, a negative electrode mask was fixed. This negative electrode mask had similar structure and dimensions to those of that shown in FIG. 9.

By an evaporation method, an alloy film (negative electrode layer) of Al and Li was formed on the substrate provided with the mask at a degree of vacuum of $10^{-4}$ Pa. By an ICP analysis of a film formed on a stainless steel substrate for film thickness measurement, it was found that the film thickness was 1 µm, and the composition ratio (atomic ratio) of Al to Li was 3 to 1.

Next, battery evaluation of the thin film battery thus formed was performed. A part of the positive electrode layer was rasped in a dry room at a dew point of $-60°$ C. to expose an Al metal surface as a lead fixing portion, and an Al-made lead was welded to the lead fixing portion by ultrasonic welding. In addition, a lead of a Cu foil was welded to a lead fixing portion of the Li-Al alloy film by ultrasonic welding. Furthermore, portions other than the end portions of the leads were sealed with a polymer-made sealing material and a sealing member made of an aluminum laminate bag, so that only the end portions were exposed.

By using this battery, a charge-discharge cycle test in a voltage range of 4.2 to 3 V was performed at 1 C by constant current control. Before the charge-discharge test, an OCV (open circuit voltage) of 3 V or more was observed. In addition, when the battery in a charged state was held for 24 hours, the voltage drop was not observed at all, and it was confirmed that no short-circuiting occurred between the positive electrode layer and the negative electrode layer. Furthermore, in this cycle test, a stable drive of 1,000 cycles or more was confirmed.

Experimental Example 3

In accordance with the structure shown in FIG. 1, a thin film lithium battery was formed using an Al foil for the positive electrode collector, a $LiMn_2O_4$ film for the positive electrode, Li-P-S-O for the solid electrolyte layer, and a Li metal film for the negative electrode layer. A square Al foil having a thickness of 10 μm and a side length of 10 cm was fixed to a stainless steel-made substrate holder, and a stainless steel-made mask was fixed on the above Al foil. The mask had similar structure and dimensions to those of the mask shown in FIG. 8.

The $LiMn_2O_4$ film (positive electrode layer) was formed on this substrate by an excimer laser ablation method. A KrF excimer laser having a wavelength of 248 nm was used as the excimer laser. Film formation was performed for 5 hours under laser conditions in which a substrate temperature was 500° C., the degree of vacuum was $10^{-2}$ Pa in an oxygen gas atmosphere, a repetitive pulse was 10 Hz, and an energy density was 2 j/cm$^2$. At this stage, right before the laser film formation, cleaning of a substrate surface was performed using argon ion beams. When a film on a Si substrate provided beforehand for film thickness measurement was measured using a stylus type film thickness meter, it was found that the film thickness of the positive electrode layer was 10 μm, and that the capacity of a positive electrode active material provided over the entire substrate was 1.2 mAh. In addition, when the electrical resistance of the surface of the Al foil on which the positive electrode layer was not formed was measured, it was 1 MΩ or more, and it was found that an electrical insulating layer was formed on the surface of the Al foil.

After this mask was removed, in accordance with the following procedure, a solid electrolyte layer having a lithium (Li)-phosphorus(P)-sulfur(S)-oxygen(O) composition was formed over the entire surface of the substrate by an excimer laser ablation method. In a glove box in which an argon gas having a dew point of –80° C. was filled, lithium sulfide ($Li_2S$), phosphorus pentasulfide ($P_2S_5$), and phosphorus pentoxide ($P_2O_5$) were mixed together, and the mixed powder thus obtained was further placed in a mold, followed by applying a pressure, so that a target in the form of pellet was formed.

The target was transferred from the glove box to a film-forming apparatus so as not to be exposed to air and was placed therein, and laser light was focused on the target to vaporize a raw material, thereby forming a film of the solid electrolyte layer on the substrate. The substrate is not particularly heated.

After the film of the solid electrolyte layer was formed, the film composition was analyzed by ESCA 5400MC manufactured by Phi Inc, and it was found that the lithium(Li)-phosphorus(P)-sulfur(S)-oxygen(O) composition included 26, 13, 54, and 7 atomic percent, respectively. In addition, when the cross-section of the film on the Si substrate for film thickness measurement was observed by a scanning electron microscope (SEM), it was found that the thickness of the solid electrolyte layer was 1 μm. Furthermore, when a comb electrode of Au was formed on the solid electrolyte layer provided on a glass substrate, and complex impedance measurement was then performed, it was found that the ion conductivity of the solid electrolyte layer was $2 \times 10^{-4}$ S/cm.

On the substrate on which the collector, the positive electrode layer, and the solid electrolyte layer were formed, a negative electrode mask was fixed. Although this negative electrode mask had a similar structure to that shown in FIG. 9, the mask used in this example was different therefrom since the connection portions of the comb electrode holes 81 and 82 with the major wire hole 83 were each formed to have a fine wire hole. That is, as shown by two-dot chain lines in FIG. 9, at the connection portions of the comb electrode holes 81 and 82 with the major wire hole 83, fine wire holes 85 are formed which have a width smaller than that of the wiring holes 81A and 82A and the major wire hole 83. In this case, the portions formed by the comb electrode holes 81 and 82 are divided regions, the portion formed by the major wire hole 83 is a lead portion, and fine wire portions of the negative electrode layer formed at the fine wire holes are meltdown portions. The width of this fine hole is 0.1 mm.

By an evaporation method, a Li metal film to be used as the negative electrode layer was formed on the substrate provided with the mask at a degree of vacuum of $10^{-4}$ Pa. By an ICP analysis of a film formed on a stainless steel substrate for film thickness measurement, it was found that the film thickness was 1 μm.

Next, battery evaluation of the thin film battery thus formed was performed. An end portion of a rear surface of the Al substrate was rasped in a dry room at a dew point of –60° C. to expose an Al metal surface, and an Al-made lead was welded to this metal surface by ultrasonic welding. In addition, a lead of a Cu foil was welded to a lead fixing portion of the Li metal film by ultrasonic welding. Furthermore, portions other than the end portions of the leads were sealed with a polymer-made sealing material and a sealing member made of an aluminum laminate bag, so that only the end portions were exposed.

The battery thus formed was placed in a glove box in which an Ar gas was circulated, and a charge-discharge cycle test in a voltage range of 4.3 to 3.3 V was performed at 1 C by constant current control. Before the charge-discharge test, an OCV (open circuit voltage) of 3 V or more was observed. In addition, when the battery in a charged state was held for 24 hours, the voltage drop was not observed at all, and it was confirmed that no short-circuiting occurred between the positive electrode layer and the negative electrode layer. Furthermore, also in this cycle test, a stable drive was confirmed.

Next, during the charge-discharge test, one of the comb electrodes of the negative electrode layer was penetrated by a metal needle from the above so as to cause short-circuiting between a part of the negative electrode layer and the collector of the positive electrode layer. Immediately after the metal needle was penetrated, a fine wire having a width of 0.1 mm and connecting between this comb electrode portion and the major wire was melted down; however, the other comb electrode portions continued stable charge-discharge cycles without causing any abnormal events.

Experimental Examples 4 to 7

In accordance with the method described in Experimental Example 1, a thin film lithium secondary battery having the structure shown in FIG. 1 was formed using a different negative electrode layer material, and a charge-discharge cycle test similar to that in Experimental Example 1 was performed for this battery. Materials of negative electrode layers, positive electrode layers (positive electrode active materials), materials of positive electrode collectors, and test results, according to individual experimental examples, are shown in the Table below. In all the experimental examples shown in the Table below, it was confirmed that a stable drive of 1,000 cycles or more can be achieved, and that preferable charge-discharge cycle properties are obtained.

TABLE

| | Negative Electrode Layer Material | Positive Electrode Active Material | Positive Electrode Collector | Charge-Discharge Cycle Performance |
|---|---|---|---|---|
| Experimental Example 4 | Si—Li (1:1) | $LiCoO_2$ | Al | Good |
| Experimental Example 5 | Sn element | $LiCoO_2$ | Al | Good |
| Experimental Example 6 | Bi—Li (1:1) | $LiCoO_2$ | Al | Good |
| Experimental Example 7 | In element | $LiCoO_2$ | Al | Good |

Experimental Example 8

Next, the battery of Example 7 described with reference to FIG. 7 was formed. The basic structure of this battery was similar to that of Experimental Example 1. However, this battery was different from that in Experimental Example 1 since the Li-P-S-O in Experimental Example 1 was used as a second electrolyte layer, and before this second electrolyte layer was formed by a laser ablation method, Li-P-S-N was formed as a first electrolyte layer. In this example, lithium phosphate was sputtered in a mixed gas atmosphere at a pressure of 100 mm Torr (0.13 Pa) containing 20 percent by volume of nitrogen and 80 percent of volume of oxygen, so that a Li-P-S-N film having a thickness of 0.1 μm was formed. The interface resistance between the first electrolyte layer 40L and the positive electrode layer 20 was 1,000 $\Omega \cdot cm^2$ or less, and the interface resistance between the second electrolyte layer 40U and the negative electrode layer 50 was 10,000 $\Omega \cdot cm^2$ or less.

When the thin film battery thus obtained was evaluated, it was confirmed that the battery of this example could have a current capacitance approximately 5 times that of the battery of Experimental Example 1.

INDUSTRIAL APPLICABILITY

The battery according to the present invention can be preferably used as a rechargeable secondary battery and, in particular, without using an electrolyte solution, the above battery can be preferably used as an all-solid-state lithium secondary battery having superior safety, heat-resistance, and low-temperature performance. For example, it is expected that this battery be used as power sources of various portable or mobile type electric and electronic devices. In addition, the battery of the present invention, which has superior heat resistance and large capacity, can also be used, for example, as a battery for electronic substrates to be placed in a reflow step in which brazing of wires is simultaneously performed in a heating furnace, a back-up power source used for electronic circuits of automobiles and the like, and a main power source which requires heat resistance.

The invention claimed is:

1. A thin film lithium battery comprising:
a positive electrode layer;
a negative electrode layer;
a solid electrolyte layer provided therebetween; and
at least one collector, which are laminated to each other,
wherein said at least one collector is electrically connected to at least one of the positive electrode layer and the negative electrode layer,
wherein the positive electrode layer and the negative electrode layer are disposed at positions so as not to be overlapped with each other when the battery is viewed along the lamination direction of the layers, and
wherein the solid electrolyte layer is in contact with an upper surface of the positive electrode layer and is in contact with a lower surface of the negative electrode layer.

2. The thin film lithium battery according to claim 1, wherein the positive electrode layer and the negative electrode layer are not disposed on the same plane.

3. The thin film lithium battery according to claim 1,
wherein the collector comprises a metal,
one of the electrode layers is directly formed on a part of the collector with no electrical insulating layer provided therebetween, and
an electrical insulating layer is formed on a surface of the other part of the collector on which said one of the electrode layers is not formed.

4. The thin film lithium battery according to claim 1, wherein the collector is formed on a part of an insulating substrate, and one of the electrode layers is formed so as to cover the collector.

5. The thin film lithium battery according to claim 1, wherein the negative electrode layer comprises one selected from the group consisting of a Li metal and a material capable of forming an alloy with a Li metal, or a mixture or an alloy thereof, and the negative electrode layer is also used as the collector.

6. The thin film lithium battery according to claim 5, wherein the material capable of forming an alloy with a Li metal comprises at least one selected from the group consisting of aluminum (Al), silicon (Si), tin (Sn), bismuth (Bi), and indium (In).

7. The thin film lithium battery according to claim 5, wherein the negative electrode layer comprises:
a plurality of divided regions;
a lead portion used for power collection; and
meltdown portions which connect the divided regions to the lead portion, and
when some of the divided regions and a collector facing thereto are short-circuited, a meltdown portion between the lead portion and the short-circuited divided region is melted down.

8. The thin film lithium battery according to claim 1, wherein the solid electrolyte layer has a first electrolyte layer facing the positive electrode layer and a second electrolyte layer facing the negative electrode layer, and the first electrolyte layer has a composition different from that of the second electrolyte layer.

9. A thin film lithium battery comprising:
a collector comprising a metal;
a positive electrode layer laminated on said collector;
a solid electrolyte layer laminated on said positive electrode;
a negative electrode layer laminated on the side of said solid electrolyte layer opposite to the side on which said positive electrode is disposed, said negative electrode layer being disposed at a position so as not to be overlapped with said positive electrode layer when said thin film lithium battery is viewed along said laminated direction; and an insulating layer formed between said collector and said solid electrolyte.

10. A thin film lithium battery comprising:

a collector comprising a metal;

a negative electrode layer laminated on said collector;

a solid electrolyte layer laminated on said negative electrode;

a positive electrode layer laminated on the side of said solid electrolyte layer opposite to the side on which said negative electrode is disposed, said positive electrode layer being disposed at a position so as not to be overlapped with said negative electrode layer when said thin film lithium battery is viewed along said laminated direction; and an insulating layer formed between said collector and said solid electrolyte.

* * * * *